United States Patent
Suarez (10) Patent No.: US 9,235,579 B1
(45) Date of Patent: Jan. 12, 2016

(54) SCALABLE ENTERPRISE DATA ARCHIVING SYSTEM

(75) Inventor: Eduardo Suarez, Marlow (GB)

(73) Assignee: Symantec Corporation, Mountain View, CA (US)

( * ) Notice: Subject to any disclaimer, the term of this patent is extended or adjusted under 35 U.S.C. 154(b) by 1022 days.

(21) Appl. No.: 12/492,644

(22) Filed: Jun. 26, 2009

(51) Int. Cl.
*G06F 17/30* (2006.01)

(52) U.S. Cl.
CPC ...... *G06F 17/30073* (2013.01); *G06F 17/3007* (2013.01)

(58) Field of Classification Search
CPC ................................................. G06F 17/30073
See application file for complete search history.

(56) References Cited

U.S. PATENT DOCUMENTS

| | | | |
|---|---|---|---|
| 7,277,903 B2 | 10/2007 | Petrocelli | |
| 7,379,978 B2 | 5/2008 | Anderson | |
| 7,412,489 B2 | 8/2008 | Nowacki | |
| 7,707,188 B2 | 4/2010 | Pandya | |
| 7,711,703 B2 | 5/2010 | Smolen | |
| 7,913,053 B1 * | 3/2011 | Newland | 711/172 |
| 2002/0123999 A1 * | 9/2002 | Bankert et al. | 707/10 |
| 2004/0210608 A1 * | 10/2004 | Lee et al. | 707/204 |
| 2008/0288947 A1 * | 11/2008 | Gokhale et al. | 718/103 |

OTHER PUBLICATIONS

"Fundamentals of Multiagent Systems with NetLogo Examples," Jose M. Vidal, 2007; http://multiagent.com/2008/12/fundamentals-of-multiagent-systems.html.
"Data Sheet: Archiving—Symantec Enterprise Vault™", Symantec Corp., 2008.

* cited by examiner

*Primary Examiner* — Usmaan Saeed
*Assistant Examiner* — Paul Kim
(74) *Attorney, Agent, or Firm* — Meyertons, Hood, Kivlin, Kowert & Goetzel, P.C.

(57) ABSTRACT

Various embodiments of a system and method for archiving data items to one or more archival storage devices are described. According to some embodiments of the method, an archival software application may implement a plurality of producer agents, where each of the producer agents is executable to produce items of a different type. The archival software application may also implement a plurality of archiving agents for archiving the items produced by the producer agents to one or more archival storage devices. In some embodiments each of the archiving agents may be executable to archive any item of any type produced by the producer agents. The archival software application may also implement a plurality of indexing agents executable to create a searchable index of the items archived to the one or more storage devices.

17 Claims, 8 Drawing Sheets

SCALABLE ENTERPRISE DATA ARCHIVING SYSTEM

BACKGROUND OF THE INVENTION

1. Field of the Invention

This invention relates to a system and method for archiving distributed computer system data to one or more archival storage devices in an efficient and scalable manner.

2. Description of the Related Art

Large organizations typically use networked computer systems that include many different physical nodes, many of which produce data items such as emails, files, databases, etc. Current and frequently used data items are typically kept on fast but expensive storage devices. Organizations often employ archival software to move old or infrequently accessed data items to archival storage devices where they can be stored more cheaply. As part of the archival process, a searchable index is often created so that the archived data items can be easily searched for and located in the archives.

A large organization may include many different types of computer systems that produce many different types of data items. It can be very difficult for administrators to configure an archival system to archive and index all of the various types of data items produced by the different computer systems in such a way that the archival system makes efficient use of its computer resources, and in also in such a way that enables the archival system to be easily scaled up to handle increased workloads.

SUMMARY

Various embodiments of a system and method for archiving data items to one or more archival storage devices are described herein. According to some embodiments of the method, an archival software application may implement a plurality of producer agents, where each of the producer agents is executable to produce items of a different type. The archival software application may also implement a plurality of archiving agents for archiving the items produced by the producer agents to one or more archival storage devices. In some embodiments each of the archiving agents may be executable to archive any item of any type produced by the producer agents. The archival software application may also implement a plurality of indexing agents executable to create one or more searchable indexes of the items archived to the one or more storage devices.

In some embodiments the archiving agents may be executable to archive the items produced by the producer agents to the one or more storage devices without using a central controller to assign each item to a particular archiving agent. For example, the archiving agents may be executable to communicate amongst themselves to determine which archiving agent should archive each item produced by the producer agents. In other embodiments the archival software application may implement a central controller executable to assign each item produced by the producer agents to a respective one of the archiving agents.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
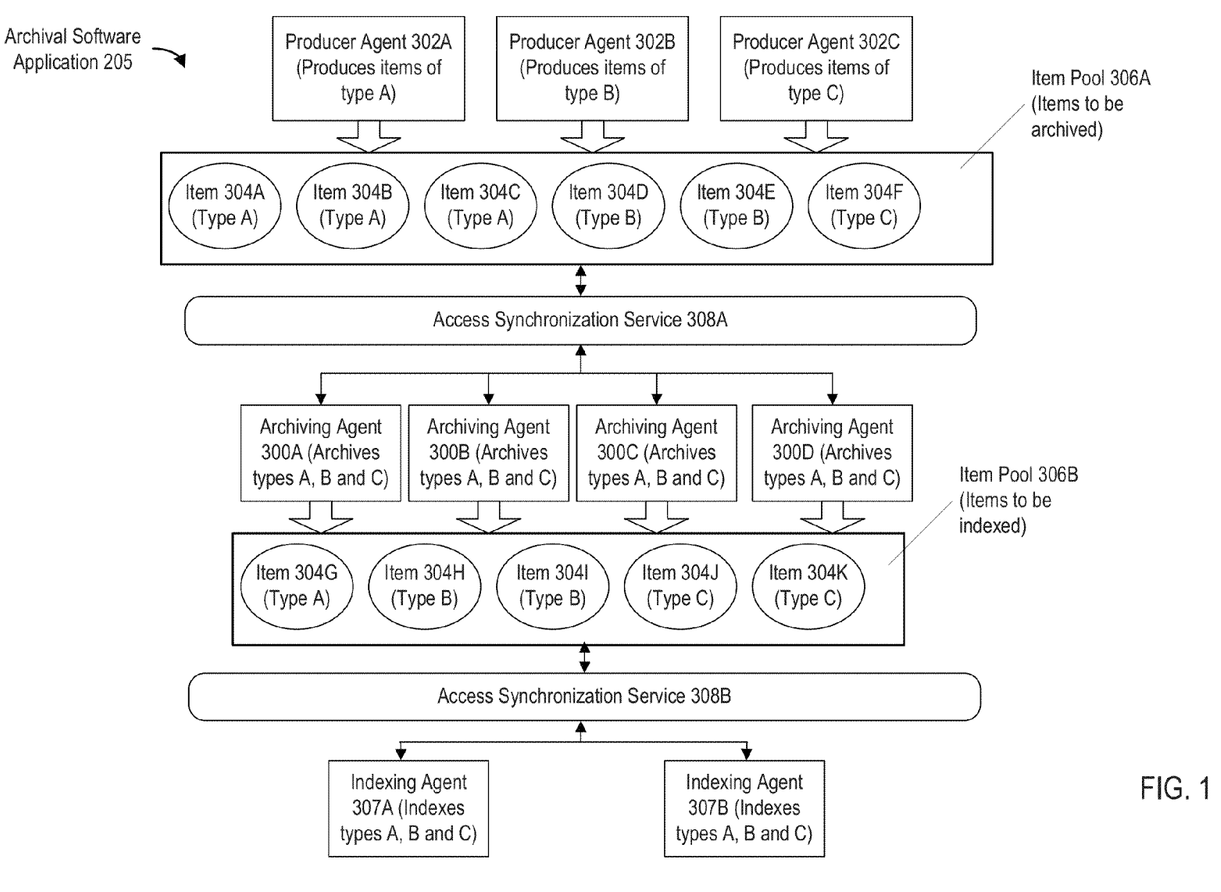
FIG. 1 illustrates one embodiment of a software architecture for an archival software application, where the archival software application implements a plurality of producer agents, a plurality of archiving agents, and a plurality of indexing agents.

Various embodiments of a system and method for archiving data items to one or more archival storage devices are described herein. FIG. 1 illustrates one embodiment of a software architecture for an archival software application 205 that executes on one or more computers to perform the data archival. The archival software application 205 may implement a plurality of producer agents 302 that produce items 304 to be archived. In the illustrated embodiment, each producer agent 302 executes to produce items of a different type. For example, the producer agent 302A produces items of a type A, the producer agent 302B produces items of a type B, and the producer agent 302C produces items of a type C.

Each item type may be any type of item that is necessary or desired to be archived. As one example, the producer agent 302A may produce email items (e.g., individual emails or other items created by an email service), the producer agent 302B may produce file system items (e.g., files or portions of block-level data created by a file system, and/or metadata created by the file system), and the producer agent 302C may produce database items (e.g., database tables or other objects created by a relational database system, object-oriented database system, or other database system). Other examples of item types that may be produced by various producer agents 302 for archiving include instant messaging (IM) conversations, voice mail items, video conferencing items, etc. In other embodiments the producer agents 302 may produce items of any of various other types.

It is noted that in some embodiments the item types mentioned above (e.g., email items, file system items, database items, etc.) may be further distinguished into more specific types. For example, in some embodiments email items produced by a Microsoft Exchange email system may be considered as items of a different type than email items produced by a Lotus Domino email system. As another example, database items produced by one type of database may be considered as items of a different type than database items produced by another type of database.

As used herein, "producing" an item means making the item available to be archived to one or more archival storage devices. It is noted that the items produced by a given producer agent 302 may originate externally to the producer agent 302. For example, each producer agent 302 may be implemented in an archival software application 205 which operates largely independently from other software programs that originally create the items to be archived. For example, in some embodiments the producer agents 302 may communicate with external server programs to obtain the items they produce, such as one or more email server, file system server, and/or database server programs. In some embodiments each producer agent 302 may execute on the same physical computer or node as the program(s) that originally creates the respective items produced by the producer agent 302. In other embodiments each producer agent 302 may execute on a different physical computer or node than the program(s) that originally creates its items. In the latter embodiment the producer agents 302 may obtain the items they produce by communicating through a network with the programs that originally create the items. In yet other embodiments a producer agent 302 may be implemented in a distributed manner so that the producer agent 302 executes across multiple physical computers or nodes, such as one or more computers that execute a program that originally creates the items, as well as one or more separate archival server computers.

In some embodiments the producer agents 302 may make their respective items available to be archived by adding them to an item pool. For example, in FIG. 1 the item pool 306A includes items 304A-F, which are items that are ready to be archived. The items 304A-C of type A were added to the item pool 306A by the producer agent 302A. The items 304D-E of type B were added to the item pool 306A by the producer agent 302B. The item 304F of type C was added to the item pool 306A by the producer agent 302C.

In various embodiments the item pool 306A may be implemented in any of various ways. For example, in some embodiments the item pool 306A may be represented as a list or database of objects, where each object represents an item in the pool. Thus, a producer agent 302 may add a new item to the item pool 306A by adding a new object representing the item to the list or database. In some embodiments an object representing a particular item may include the actual data of the item. For example, if the item is a file then the object may include the actual data contained in the file. In other embodiments an object representing a particular item may include information indicating where the item data can be found without the item data actually being duplicated in the object. For example, if the item is a file then the object may include a file system pathname indicating where the file data can be found. An object representing a particular item may also include other information in addition to the item data or the reference to the item data. For example, the producer agent 302 which creates the object may include other information in the object such as the type of the item, a timestamp indicating when the item is being added to the pool, a priority for archiving the item, metadata associated with the item, etc.

Referring again to FIG. 1, the archival software application 205 may also implement a plurality of archiving agents 300 that archive the items produced by the producer agents by storing the items in one or more archives maintained on one or more archival storage devices. In some embodiments all of the items of various types may be stored in the same archive. In other embodiments, different types of items may be stored in different archives, or there may be multiple archives for items of a particular type, and the appropriate archive for a given item may be selected based on the time when the item is being archived and/or based on various properties of the item.

Archiving each item may include copying data representing the item to an archive on one or more archival storage devices. For example, if the item is an email then archiving the item may include copying data representing the email to a particular archive. This may include copying the email body, as well as other information such as its sender, recipients, timestamp, etc. As another example, if the item is a file then archiving the item may include copying data representing the file to a particular archive. This may include copying the file data, as well as metadata such as its creation and modification times, owner, size information, etc. In some embodiments items may be stored in the archive in a different form than the form in which they were originally stored. For example, in some embodiments item data may be compressed to save storage space on the archival storage device.

In some embodiments each of the archiving agents 300 may be able to archive any item of any type produced by the producer agents 302. In the example of FIG. 1, each of the archiving agents 300 is able to archive the items of type A produced by the producer agent 302A, the items of type B produced by the producer agent 302B, and the items of type C produced by the producer agent 302C. In other embodiments, some, but not all, of the archiving agents 300 may be able to archive any item of any type produced by the producer agents 302. In other embodiments, at least a subset of the archiving agents 300 may be able to archive a plurality of item types (but not necessarily all item types) produced by the producer agents 302. Since in some embodiments different types of items may need to be archived in different archives or using different techniques, it may be necessary to design the archiving agents as "intelligent agents" that can store multiple types of items in multiple types of archives.

In certain prior art archival systems, each archiving server is mapped to a particular item type such that it is only able to archive items of that particular type. For example, consider a prior art archival system that includes three archiving servers as follows: a first archiving server that can archive only items of a first type; a second archiving server that can archive only items of a second type; and a third archiving server that can archive only items of a third type. At any given time, one of these archiving servers may be idle because no items of the type it is configured to process are currently ready to be archived. At the same time, another of the servers may be operating at full capacity with a large queue of items of the type it is configured to process waiting to be archived. This may result in an inefficient use of the overall resources available in the system.

In various embodiments, enabling at least a subset of the archiving agents 300 to archive multiple item types as described herein may improve the efficiency of the system. Each respective archiving agent 300 may continuously archive items produced by the producer agents 302 as long as items of the types that can be handled by the respective archiving agent 300 are available. An archiving agent 300 which is able to archive multiple item types is less likely to be idle at any given time since the probability is increased that an item of at least one of its respective types is currently ready to be archived. In some embodiments this may help to prevent a large queue of items of a certain type from building up and may result in an overall decrease in the average amount of time required to archive items. In some embodiments where each of the archiving agents 300 can archive any item of any type produced by the producer agents 302, none of the archiving agents 300 may become idle unless there are no items of any type that need to be archived. Thus, even if some of the producer agents 302 are idle at a given time and not producing new items of some types, all of the archiving agents 300 may still be actively processing items of other types.

In addition to improving the efficiency of the system, enabling the archiving agents 300 to handle items of multiple types may also decrease the complexity of configuring the system in some embodiments. In a prior art system where each archiving server is mapped to one particular type of item, it can be difficult to configure the system so as to achieve load balancing and scalability because this configuration typically requires knowledge of the overall expected workload per item type/archiving server. In many environments the relative numbers of items of various types that will need to be archived may be hard to determine. Even if it can be determined, the pattern of incoming item types may vary at different times of the day or week. And even if an appropriate number of archiving servers and an appropriate mapping of items types to archiving servers can be configured, the configuration requirements may change over time, e.g., from one year to the next. All of these factors can make it difficult to configure and maintain the system.

In contrast, designing an archival system so that it uses archiving agents 300 which are able to handle items of multiple types as described herein may make it much easier to configure the system since less knowledge regarding the pattern of incoming item types may be necessary. In addition, an administrator may be able to easily re-configure the system by simple increasing or decreasing the number of archiving agents 300. For example, in some embodiments the archival software application 205 may include an administration tool that provides a graphical user interface allowing a user (e.g., an administrator) to specify a desired number of archiving agents 300. The archival software application 205 may then instantiate the specified number of archiving agents 300. Thus, if the workload of the archival system increases over time, scalability may be achieved by simply adding additional archiving agents 300 (as well as possibly adding additional physical server computers for the archiving agents 300 to execute on). In some embodiments the archival software application 205 may be configured to automatically adjust the number of archiving agents 300 over time depending on the current workload.

As discussed above, each respective archiving agent 300 may continuously archive items as long as items of the types that can be handled by the respective archiving agent 300 are available. In some embodiments the archiving agents 300 may be configured to themselves select items from the item pool 306A without using a central controller to assign each item from the item pool 306A to a particular archiving agent 300. For example, in some embodiments the archiving agents 300 may communicate amongst themselves to determine which archiving agent 300 should archive each item produced by the producer agents 302. In some embodiments the archiving agents 300 may be designed as multiple collaborative or independent agents that cooperate according to a multi-agent system (MAS) architecture. (The producer agents 302 may also be viewed as part of the MAS, and other types of agents may also operate in conjunction with the producer agents 302 and archiving agents 300, e.g., as described below.)

In various embodiments the archiving agents 300 may use any algorithm or heuristic, may communicate using any of various techniques, and may exchange any of various types of information in order to determine which archiving agent 300 should handle each item added to the item pool 306A. For example, in one simple embodiment the archiving agents 300 may select items from the item pool 306A in a round-robin fashion. In other embodiments the archiving agents 300 may use a more sophisticated algorithm to attempt to increase the average quality of service provided for the items.

For example, in some embodiments the archiving agents 300 may collaborate according to a challenge-response-contract (CRC) scheme to decide how to assign the items from the item pool 306A to the archiving agents 300. In some embodiments each respective archiving agent may execute to publish information indicating a current estimated archival completion time for the respective archiving agent, e.g., an estimation of how long it will take the respective archiving agent to archive a new item. The estimated archival completion time may be calculated based on information such as the average archival completion time for recent items processed by the archiving agent, the number of items currently being archived by the archiving agent (if the archiving agent is configured to concurrently archive multiple items at once), and/or other information such as the current utilization of hardware resources (e.g., processor and memory resources) of the physical computer on which the archiving agent executes. Thus, the various archiving agents 300 that are available at any given time may exchange information with each other indicating their respective current estimated archival completion times, and may collaborate to choose the archiving agent 300 with the fastest current estimated archival completion time as the next archiving agent which should remove and archive an item from the item pool 306A. As the utilization of each archiving agent changes over time, its current estimated archival completion time will also change. Thus, the archiving agents may repeatedly (e.g., at timed intervals) broadcast information or publish information in a central repository to inform each other of their current respective estimated archival completion times so that the current "best" archiving agent is chosen as the next agent to handle an item from the item pool 306A at any given time. This may result in efficient archiving of the items in the item pool 306A.

In some embodiments the items 304 may be archived in the same order in which they were added to the item pool 306A, e.g., as if the item pool 306A is a queue, provided that each time an item comes to the beginning of the queue there is an available archiving agent 300 that can process items of that type. In other embodiments the items 304 may not be archived in the same order in which they were added to the item pool 306A. For example, in some embodiments the archival software application 205 may assign different priorities to different types of items or specify different quality-of-service (QoS) requirements for different types of items so that high-priority items are archived before low-priority items, and/or so that items with high quality-of-service requirements are assigned to the archiving agents best able to meet these requirements. Although high-priority items may be selected for archival before low-priority items, in some embodiments the archiving agents 300 may ensure that the low-priority items do not wait in the item pool 306A for more than a maximum amount of time. For example, if a given low-priority item has been waiting in the item pool 306A for more than a threshold amount of time then it may be selected as the next item to be archived even if there are other high-priority items in the item pool 306A.

In an embodiment in which different archiving agents 300 are able to archive different types than each other, each respective archiving agent 300 may communicate with the other archiving agents to discover information indicating which types of items can be archived by the other archiving agents. Each respective archiving agent 300 may use this information, possibly along with other information indicating how many items of each type are currently in the item pool 306A, in order to decide which item in the item pool 306A to select to archive next. For example, suppose that a particular archiving agent 300 is able to archive items of either a first type or a second type. Suppose also that the particular archiving agent 300 determines that there are currently more items of the first type in the item pool 306A waiting to be archived than items of the second type. Suppose also that the particular archiving agent 300 receives information from the other archiving agents indicating that one or more of the other archiving agents can archive items of the second type. Then the particular archiving agent 300 may select an item of the first type from the item pool 306A instead of an item of the second type because there is a fewer number of items of the second type, and those items can be handled by other archiving agents.

Thus, in various embodiments the archiving agents 300 may exchange information with each other in order to become aware of the capabilities of each other, and each archiving agent may use this information in deciding which item to select for archival next. Examples of algorithms that may be used by the archiving agents 300 include ant colony optimization algorithms and swarm intelligence algorithms.

Figure 2:
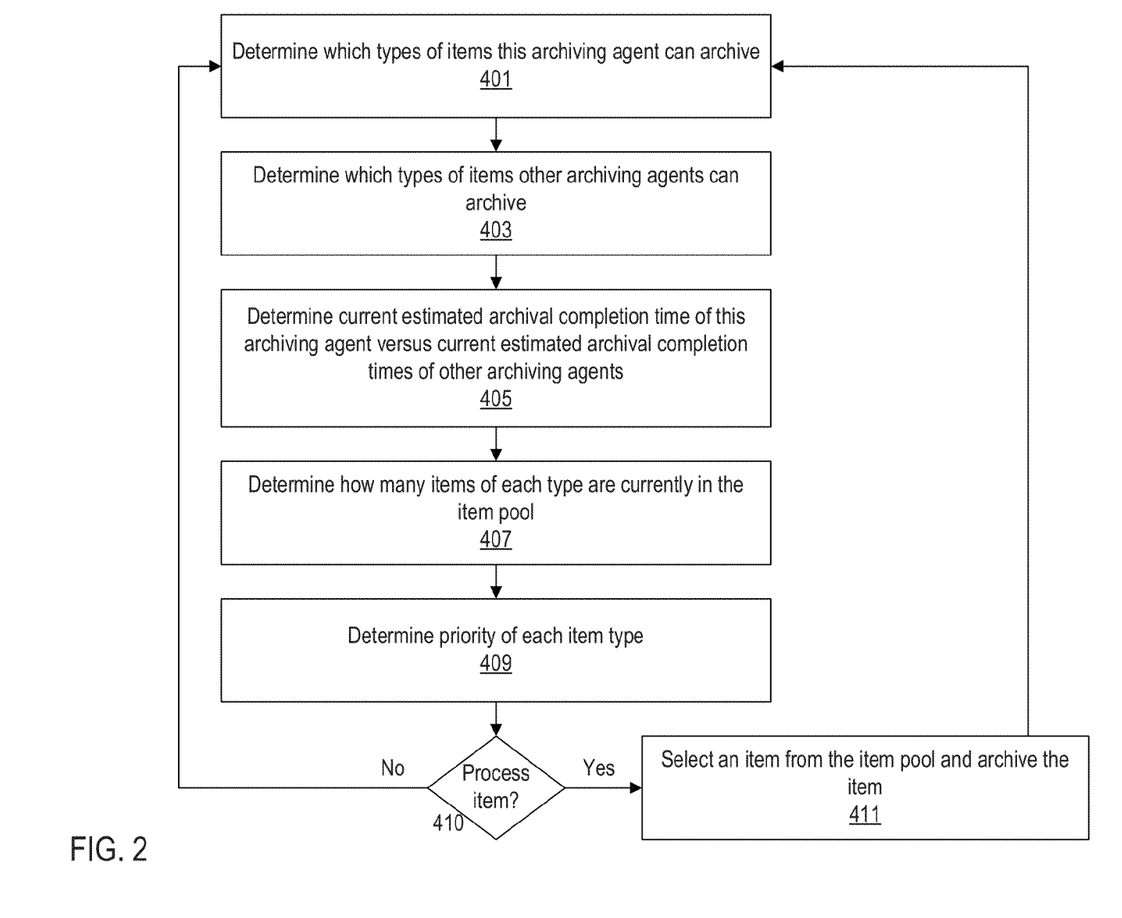
FIG. 2 is a flowchart diagram illustrating one embodiment of a method that may be used by a particular archiving agent to determine whether it should currently select an item to archive from an item pool, and if so, which item to select.

FIG. 2 is a flowchart diagram illustrating one embodiment of a method that may be used by a particular archiving agent 300 to determine whether it should currently select an item to archive from the item pool 306A, and if so, which item to select. In block 401 the archiving agent 300 may determine which types of items this archiving agent can archive. In block 403 the archiving agent 300 may determine which types of items other archiving agents implemented by the archival software application 205 can archive. In block 405 the archiving agent 300 may determine the current estimated archival completion time of this archiving agent versus current estimated archival completion times of other archiving agents. In block 407 the archiving agent 300 may determine how many items of each type are currently in the item pool. In block 409 the archiving agent 300 may determine a priority assigned to each item type. In block 410 the archiving agent 300 may use various information determined in blocks 401, 403, 405, 407 and/or 409 to determine whether it should currently archive an item. If so then the archiving agent 300 selects an item from the item pool 306A and archives the item, as indicated in block 411. The archiving agent may determine which item to select based on the information determined in blocks 401, 403, 405, 407 and/or 409.

Referring again to FIG. 1, in some embodiments the archival software application 205 may implement an access synchronization service 308A which provides a locking mechanism to ensure that different archiving agents 300 do not attempt to archive the same item.

In addition to the producer agents 302 and the archiving agents 300, the archival software application 205 may also implement a plurality of indexing agents 307 which execute to create one or more searchable indexes of the items archived to the one or more archival storage devices by the archiving agents 300. In the example of FIG. 1 there are two indexing agents 307A and 307B. The index(es) created by the indexing agents 307 may enable items to be efficiently found in the archive(s) created by the archiving agents 300, e.g., in response to queries from users or other software applications. In some embodiments a single index may be created for items of all of the various item types. In other embodiments separate indexes may be created for each item type. Any of various indexing techniques may be used to create the index(es).

Similarly as described above with respect to the archiving agents 300, in some embodiments at least a subset of the indexing agents 307 may be configured to handle items of multiple types. In the example of FIG. 1, the indexing agent 307A and the indexing agent 307B are both able to index any of the items of types A, B or C. In various embodiments, designing the indexing agents 307 to be able to handle multiple item types may provide similar benefits for the system as those discussed above regarding workload efficiency, load balancing, scalability, and ease of system administration and configuration.

In the example embodiment of FIG. 1, after an archiving agent 300 removes a particular item from the item pool 306A and finishes archiving the item, the archiving agent 300 then adds the item to another item pool 306B. The item pool 306B includes items that are ready to be indexed by the indexing agents 307. The indexing agents 307 may collaborate among themselves to decide which indexing agent 307 should be the next one at any given time to remove and process an item from the item pool 306B. In various embodiments the indexing agents 307 may use any algorithm or heuristic, may communicate using any of various techniques, and may exchange any of various types of information in order to determine which indexing agent 307 should handle each item in the item pool 306B. In some embodiments the indexing agents 307 may attempt to improve the average quality of service provided for the items, e.g., by exchanging information indicating their respective estimated indexing completion times and using this information to decide which indexing agent 307 should handle each item. As illustrated in FIG. 1, in some embodiments the archival software application 205 may implement an access synchronization service 308B which provides a locking mechanism to ensure that different indexing agents 307 do not attempt to index the same item.

It is noted that FIG. 1 illustrates one particular embodiment of the software architecture of the archival software application 205, and numerous alternative embodiments are contemplated. For example, in various embodiments there may be any number of producer agents 302, archiving agents 300 and indexing agents 307. As another example, in some embodiments the indexing agents 307 may not wait until the items 304 have been archived by the archiving agents 300 before indexing the items. Also, in some embodiments there may not be a separate item pool 306A that includes the items ready for archiving and a separate item pool 306B that includes the items ready for indexing, but instead items in a single item pool 306 may be processed by either the archiving agents 300 or the indexing agents 307. Each item currently in the item pool 306 may be represented by a respective object, and the status of the object may be updated to indicate whether the corresponding item has been archived and indexed yet. After being both archived and indexed the object may be removed from the pool.

Figure 3:
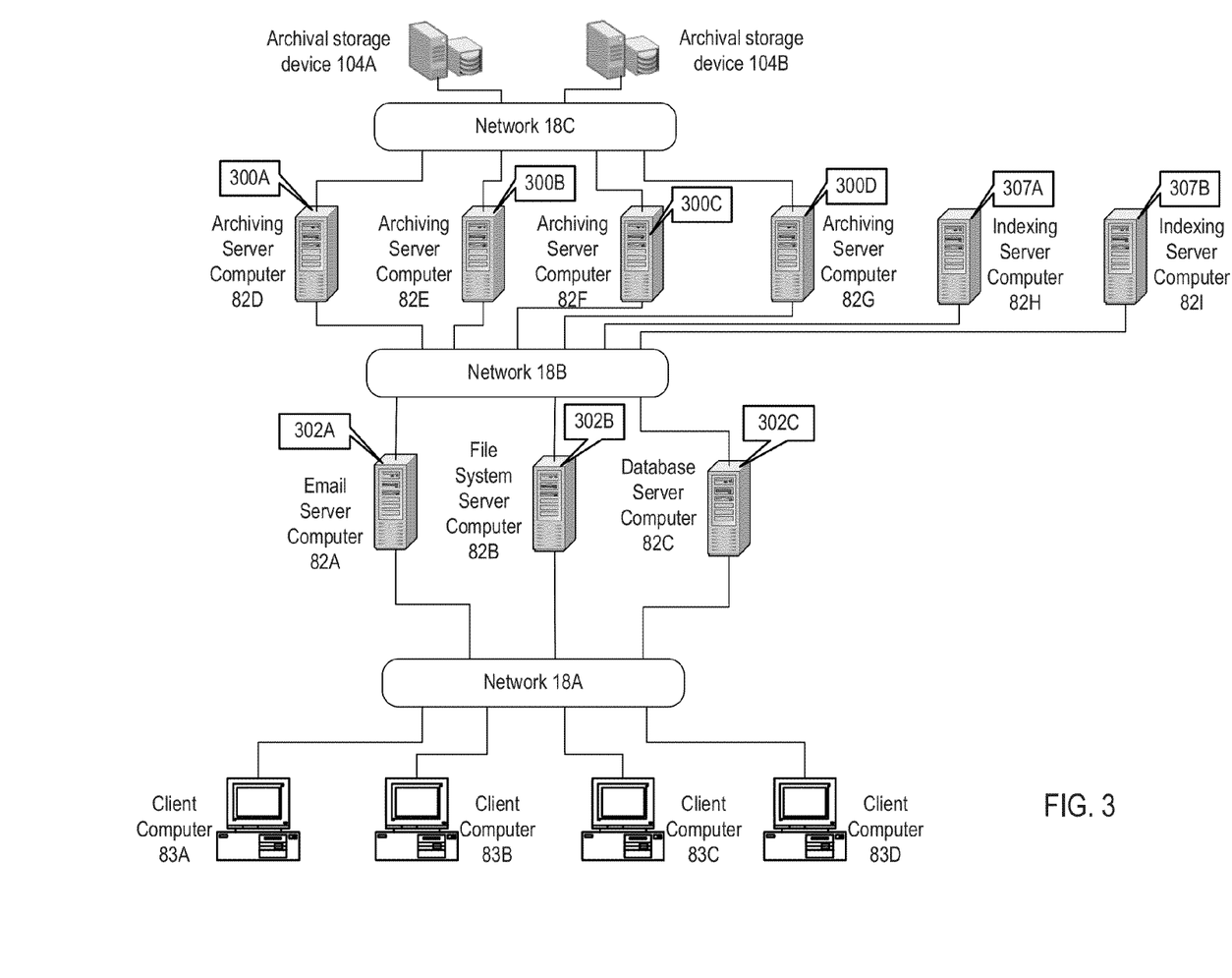
FIG. 3 illustrates one particular computing environment in which an embodiment of the archival software application may execute.

In various embodiments the archival software application 205 may execute within various types of computing environments. FIG. 3 illustrates one particular computing environment in which an embodiment of the archival software application 205 may execute. The computing environment may belong to a particular business or other organization, and the archival software application 205 may operate to archive various data items, e.g., for long-term storage. In this example the computing environment includes a plurality of client computers 83. For example, each client computer 83 may be used by a particular user or member of the organization. The client computers 83 may communicate with various server computers 82 through one or more networks 18A. For example, an email server computer 82A may provide email services to the client computers 83, a file system server computer 82B may provide file system services to the client computers 83, and a database server computer 82C may provide database services to the client computers 83.

The email server computer 82A may create email items that need to be archived, the file system server computer 82B may create file system items that need to be archived, and the database server computer 82C may create database items that need to be archived. In this example, a producer agent 302A executes on the email server computer 82A to make the email items available to each of the archiving agents 300A-D. Each of the archiving agents 300A-D executes on a respective one of the archiving server computers 82D-G, as illustrated. Similarly, the producer agent 302B executes on the file system server computer 82B to make the file system items available to each of the archiving agents 300A-D, and the producer agent 302C executes on the database server computer 82C to make the database items available to each of the archiving agents 300A-D. The archiving agents 300A-D archive the items provided by the producer agents 302A-C, e.g., by storing them in one or more archives implemented on the archival storage devices 125A and 125B.

The computing environment also includes two indexing server computers 82H and 82I which execute the respective indexing agents 307A and 307B. The indexing agents 307A and 307B execute to index the items provided by the producer agents 302A-C, e.g., by creating or updating one or more searchable indexes enabling the archived items to be looked up in response to search queries.

In this example the producer agents 302A-C communicate with the archiving agents 300A-D and/or with the indexing agents 307A-B through one or more networks 18B. The archiving agents 300A-D also communicate with the archival storage devices 125A-B through one or more networks 18C.

Figure 4:
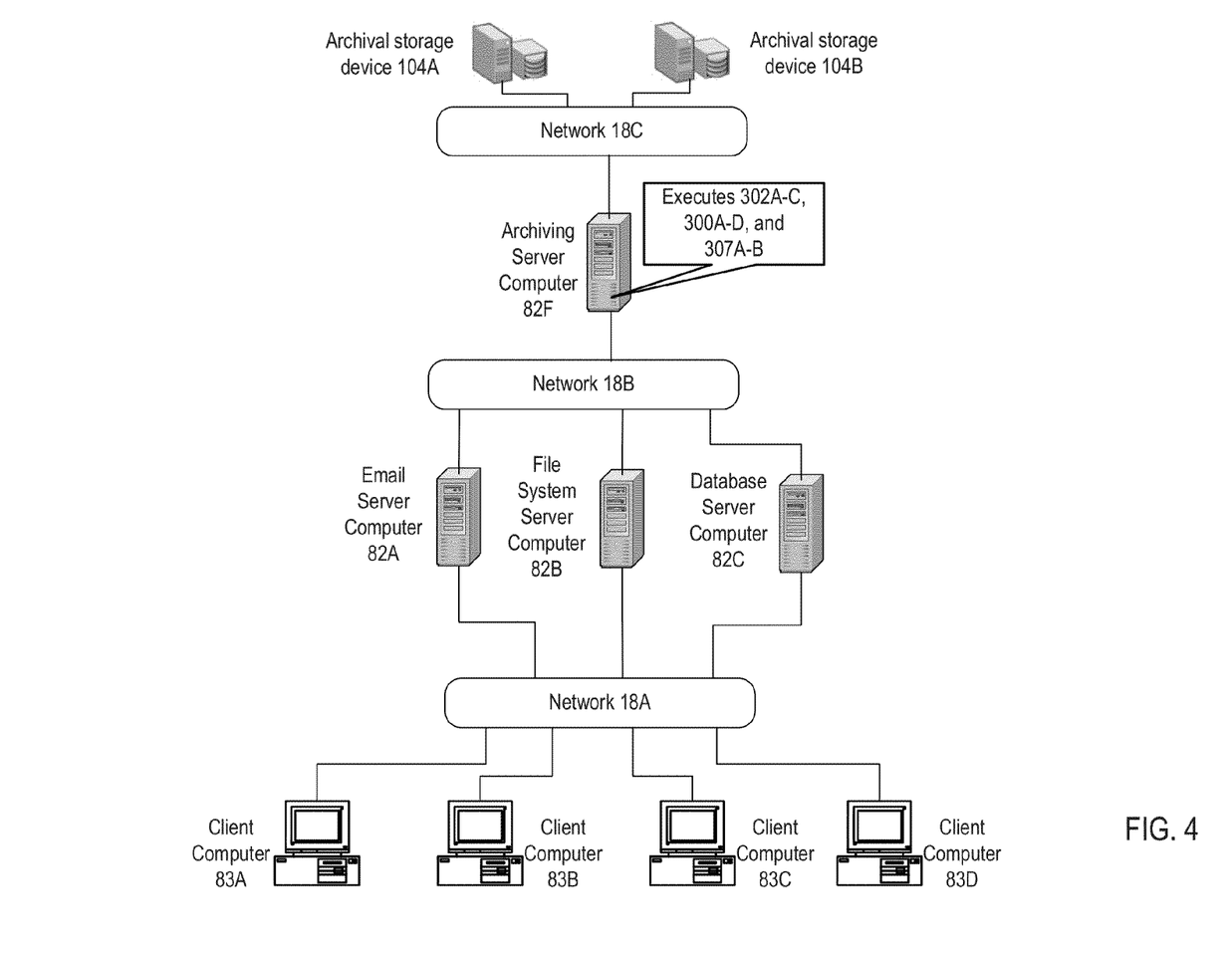
FIG. 4 illustrates another example of a computing environment in which an embodiment of the archival software application may execute.

Thus, in the example of FIG. 3, each respective producer agent 302, archiving agent 300, and indexing agent 307 executes on a different physical computer or node. In other embodiments multiple producer agents 302 may execute on the same physical computer or node as each other, multiple archiving agents 300 may execute on the same physical computer or node as each other, and/or multiple indexing agents 307 may execute on the same physical computer or node as each other. Also, in some embodiments different types of agents may execute on the same physical computer or node as each other. For example, FIG. 4 illustrates another example of a computing environment in which an embodiment of the archival software application 205 may execute. In this example, the producer agents 302A-C, the archiving agents 300A-D, and the indexing agents 307A-B all execute on the same physical archiving server computer 82F.

Figure 5:
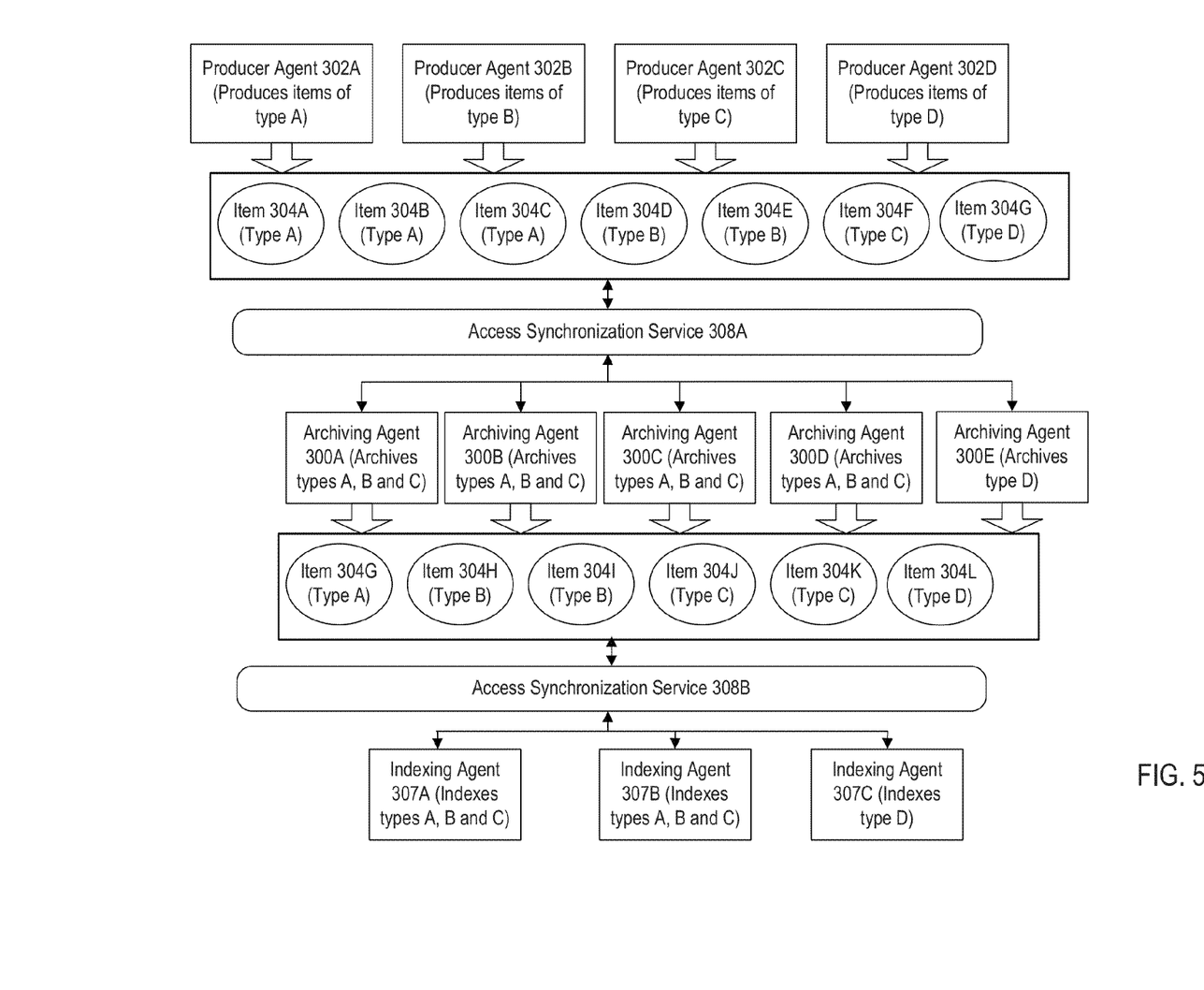
FIG. 5 illustrates another embodiment of the archival software application.

Although FIG. 1 illustrates an example in which each of the archiving agents 300 in the archival software application 205 can archive any item produced by any of the producer agents 302, in other embodiments one or more of the archiving agents 300 may not be able to archive all types of items produced by the producer agents 302. For example, FIG. 5 illustrates an example in which the producer agent 302D produces items of a type D. The archiving agent 300E is able to archive items of the type D, but cannot archive items of the types A, B, or C. Also, the archiving agents 300A-D are each able to archive items of the types A, B, and C, but cannot archive items of the type D.

In some embodiments, each of the producer agents 302 may be specialized to produce items of a single type. In some embodiments there may be multiple producer agents configured to produce items of a given type. For example, two or more of the producer agents 302 may be configured to produce items of a first type, two or more of the producer agents 302 may be configured to produce items of a second type, etc. Also, in some embodiments a given producer agent 302 may produce items of multiple types.

Figure 6:
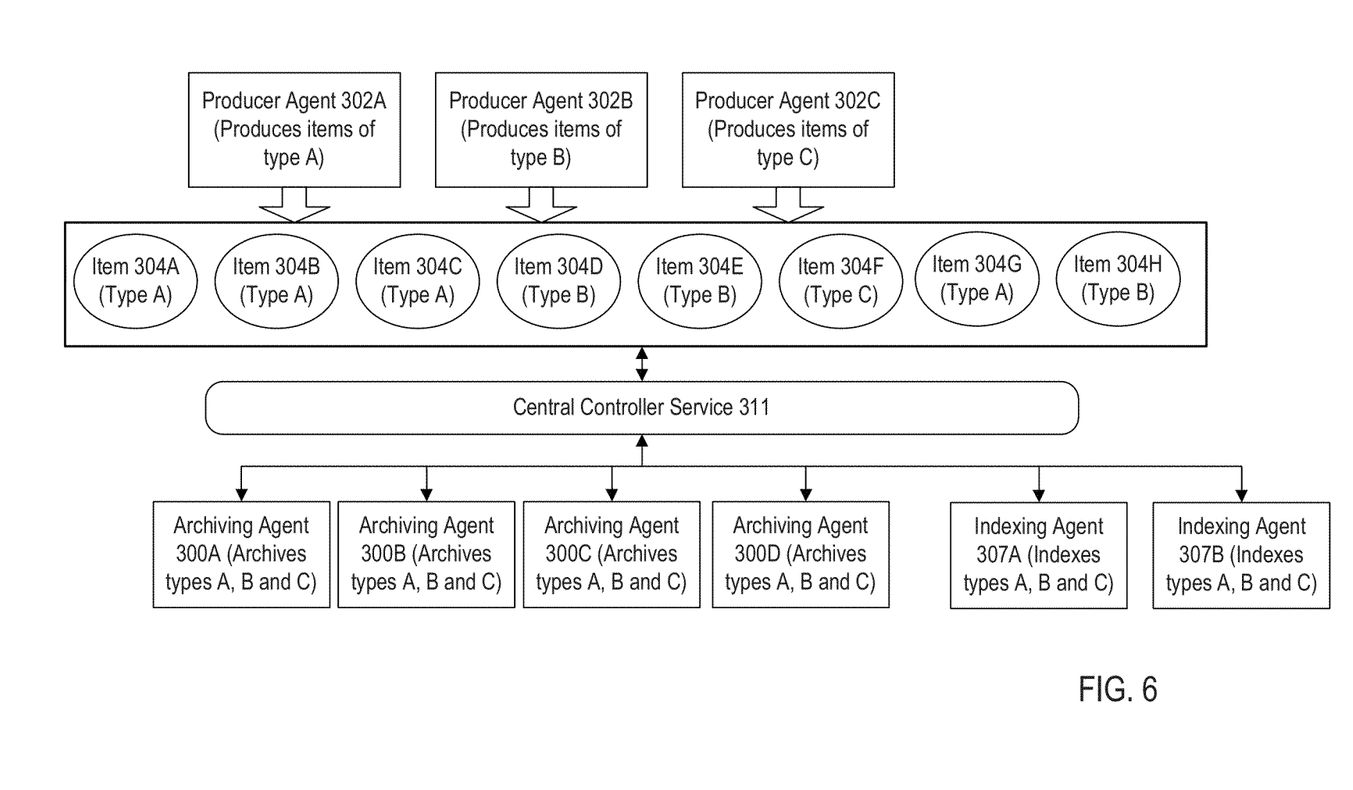
FIG. 6 illustrates an alternative embodiment of a software architecture for the archival software application.

FIG. 6 illustrates an alternative embodiment of a software architecture for the archival software application 205. In this embodiment the archival software application 205 implements a central controller service 311 which executes to assign items 304 from the item pool to the archiving agents 300 and the indexing agents 307. Thus, instead of the archiving agents 300 and the indexing agents 307 autonomously collaborating among themselves to decide which agents should archive and index which items, the central controller service 311 implements this logic.

Figure 7:
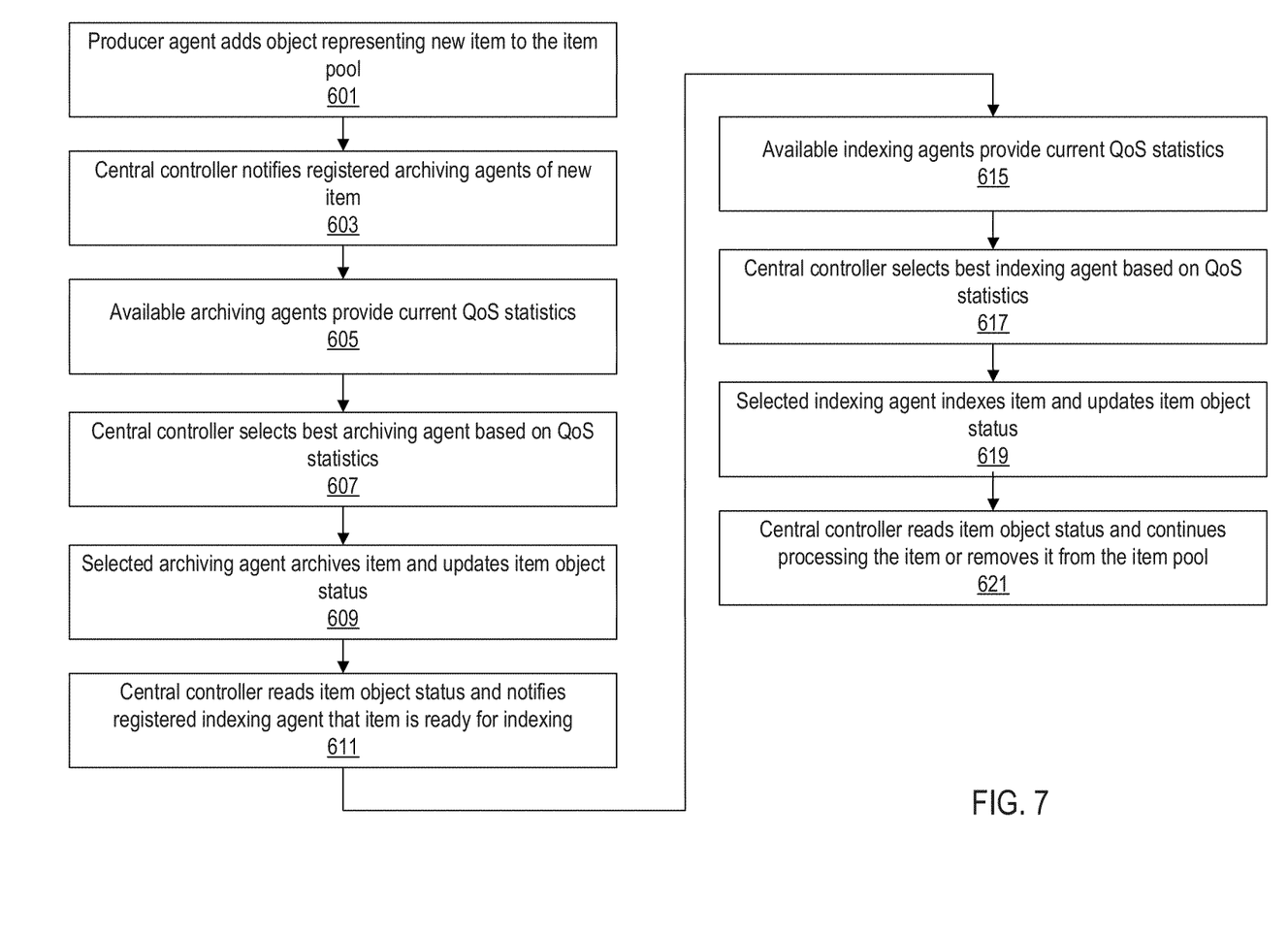
FIG. 7 is a flowchart diagram illustrating one embodiment of a method for processing an item to be archived according to an event-driven architecture.

In some embodiments the archival software application 205 may be designed to process items according to an event-driven architecture (EDA). Various agents may register their specialized skills and capabilities, and their interest in being notified of certain events, with the central controller service 311. FIG. 7 is a flowchart diagram illustrating one embodiment of a method for processing an item of a particular type according to an event-driven architecture. This flowchart assumes that each archiving agent 300 has previously registered with the central controller 311 to notify the central controller of which types of items it can archive. Similarly, each indexing agent 307 registers with the central controller 311 to notify the central controller of which types of items it can index.

In block 601 a particular producer agent 302 adds an object representing the item to the item pool. This may cause the central controller 311 to receive an event notification indicating that a new object representing a new item of the particular type was added to the item pool. The central controller may then notify each archiving agent 300 that previously registered as being able to archive items of the particular type that the new object was added, and may request each of these archiving agents 300 that are currently available to archive new items to provide statistics indicating the quality of service (QoS) level they are currently able to provide.

In block 605 each notified archiving agent 300 that is currently available to archive new items may respond by returning its current quality of service statistics to the central controller. For example, in some embodiments each archiving agent 300 may notify the central controller of its current estimated archival completion time. In block 607 the central controller may select the archiving agent 300 which replied with the fastest estimated archival completion time as the one which should archive the item, and may request that archiving agent 300 to archive the item.

As indicated in block 609, the selected archiving agent 300 may archive the item and then update the status of the object representing the item to indicate that it has been archived. This may cause the central controller to receive an event notification indicating that the item has been archived.

The central controller may then notify each indexing agent 307 that previously registered as being able to index items of the particular type that the item is ready for indexing, and may request each of these indexing agents 307 that are currently available to index new items to provide statistics indicating the quality of service (QoS) level they are currently able to provide.

In block 615 each notified indexing agent 307 that is currently available to index new items may respond by returning its current quality of service statistics to the central controller. For example, in some embodiments each indexing agent 307 may notify the central controller of its current estimated indexing completion time. In block 617 the central controller may select the indexing agent 307 which replied with the fastest estimated indexing completion time as the one which should index the item, and may request that indexing agent 307 to index the item.

As indicated in block 619, the selected indexing agent 307 may index the item and then update the status of the object representing the item to indicate that it has been indexed. This may cause the central controller to receive an event notification indicating that the item has been indexed. As indicated in block 621, the central controller may read the item object status and either continue processing the item in various ways or remove the item from the item pool. For example, some types of items may only need to be archived and indexed, while other actions may need to be performed for other types of items. If other actions are to be performed, the archival software application 205 may implement other types of agents to perform these actions.

In some embodiments the archival software application 205 may implement one or more data classification agents. In some embodiments one or more of the data classification agents may be executable to tag items in order to cause the tagged items to be processed differently by the archiving agents. The archiving agents may be configured to discover that items have been tagged in various ways, and may alter their processing of the items according to how the items have been tagged. As one example, a data classification agent may examine items and tag particular items with priority information depending on the type of item or depending on its contents. The priority information with which the items are tagged may indicate that the items should be treated by the archiving agents as high priority items or low priority items.

In other embodiments one or more of the data classification agents may be executable to tag items in order to cause the tagged items to be processed differently by the indexing agents. The indexing agents may be configured to discover that items have been tagged in various ways, and may alter their processing of the items according to how the items have been tagged.

In other embodiments one or more of the data classification agents may be executable to alter the processing of items in various other ways. For example, in some embodiments a data classification agent may examine the items added to the item pool by the producer agents and prevent certain items from being archived by the archiving agents, e.g., depending on the type of item or depending on its contents. For example, the data classification agent may simply remove the item from the item pool before it has been processed by an archiving agent.

Figure 8:
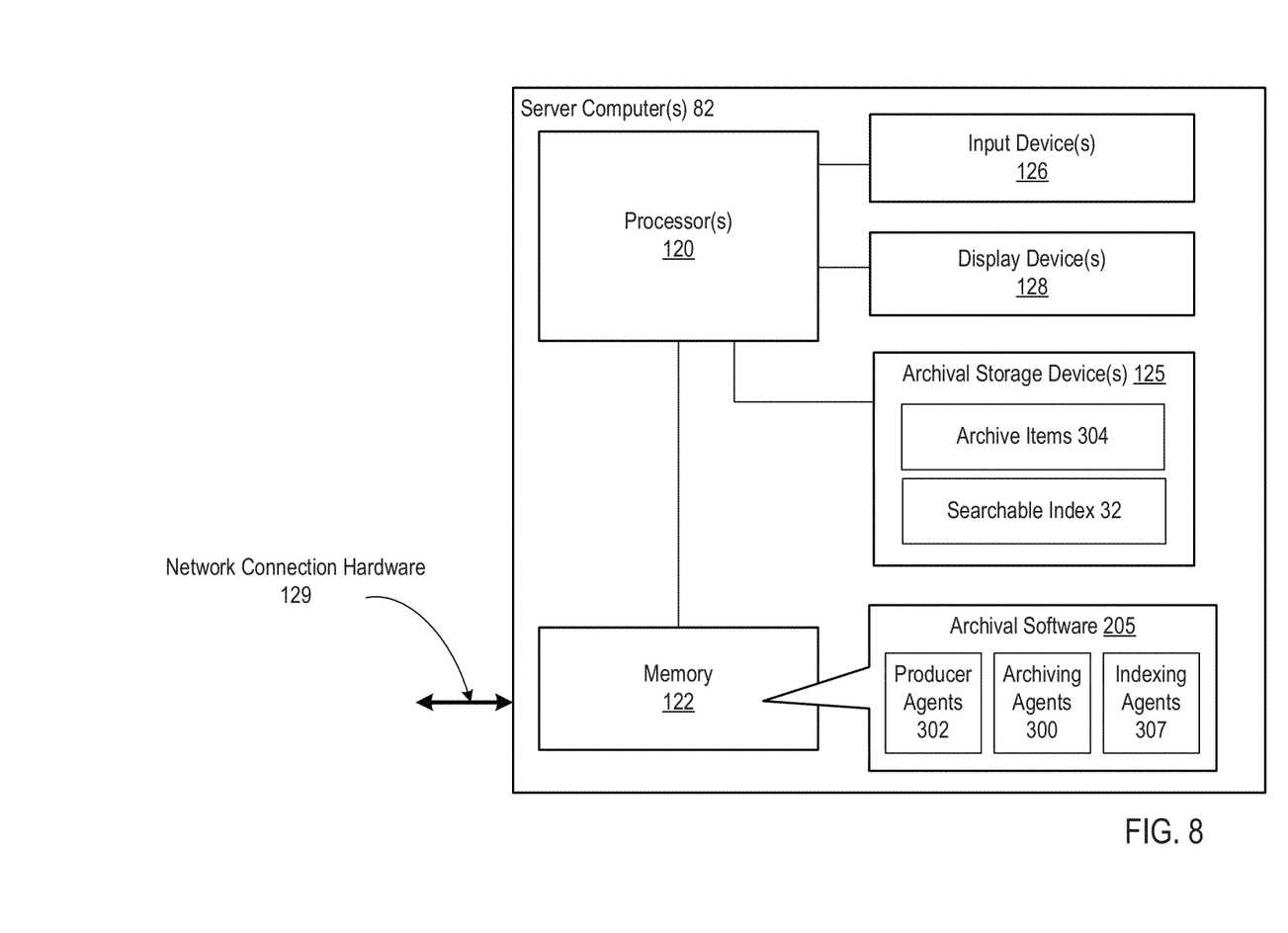
FIG. 8 illustrates an example of the one or more server computers on which the archival software application may execute according to some embodiments.

As discussed above, the archival software application 205 may execute on one or more physical server computers 82. FIG. 8 illustrates an example of the one or more server computers 82 according to some embodiments. It is noted that FIG. 8 is provided as an example, and in other embodiments the archival software application 205 may execute in various other types of computer systems.

In this example, the one or more server computers 82 include one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store the archival software application 205. As discussed above, the archival software application 205 may implement one or more producer agents 302, one or more archiving agents 300, and one or more indexing agents 307 which execute to perform various functions described herein. The memory 122 may also store other software which operates in conjunction with or which is used by the archival software application 205, such as operating system software, file system software, network communication software, etc.

It is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments one or more server computers 82 may include multiple processors 120.

The one or more server computers 82 may include one or more archival storage devices 125. Various items 304 are archived to the one or more archival storage devices 125 by the archiving agents 300. In various embodiments the one or more archival storage devices 125 may include any kind of storage device(s). Examples of archival storage devices 125 that may be used in various embodiments include tape drives (e.g., devices operable to store data on tape cartridges), disk storage units (e.g., devices including one or more disk drives), optical storage devices (e.g., devices operable to store data on optical media), flash memory storage devices, etc.

Also, in various embodiments the one or more archival storage devices 125 may be included in or coupled to the one or more server computers 82 in any of various ways. For example, in some embodiments the one or more archival storage devices 125 may be directly attached to the one or more server computers 82 or may couple to the one or more server computers 82 through one or more communication buses. In other embodiments the one or more server computers 82 may communicate with the one or more archival storage devices 125 through any type of network or combination of networks. For example, the network may include any type or combination of local area network (LAN) (e.g., the LAN 18 in FIG. 1), a wide area network (WAN), wireless networks, an Intranet, the Internet, storage area network (SAN), etc.

The one or more server computers 82 may also include one or more input devices 126 for receiving user input to be provided to the archival software application 205, e.g., from an administrator. The input device(s) 126 may include any of various types of input devices, such as keyboards, keypads, microphones, or pointing devices (e.g., a mouse or trackball). The one or more server computers 82 may also include one or more output devices 128 for displaying output to the administrator. The output device(s) 128 may include any of various types of output devices or display devices, such as LCD screens or monitors, CRT monitors, etc. The one or more server computers 82 may also include network connection hardware 129 through which the one or more server computers 82 connect to one or more networks, e.g., in order to communicate with other devices in the system.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable to implement:
    a plurality of producer agents, wherein each of the producer agents is executable to produce items of a different type and add the items to an item pool, wherein the item pool is configured to store a plurality of items having respective different types;
    a plurality of archiving agents for archiving the items produced by the producer agents to one or more archives on one or more storage devices, wherein each of the archiving agents is executable to archive any item of any type produced by the producer agents, wherein individual ones of the archiving agents are executable to select individual ones of the items in the item pool for archival, wherein the individual ones of the items in the item pool are selected for archival by particular ones of the archiving agents based at least in part on optimization of a quality of service metric provided by the archiving agents for archival of the items and based at least in part on an exchange of utilization data among individual ones of the archiving agents, wherein the quality of service metric is descriptive of a current estimated archival completion time, wherein the utilization data is descriptive of resource utilization by the archiving agents for archival of the items, and wherein individual ones of the archiving agents are executable to add archived items to an archived item pool; and
    a plurality of indexing agents executable to create one or more searchable indexes of the items archived to the one or more storage devices, wherein individual ones of the indexing agents are executable to select individual ones of the archived items from the archived item pool, and wherein the individual ones of the archived items are removed from the archived item pool in response to indexing of the individual ones of the archived items by the individual ones of the indexing agents.

2. The non-transitory computer-accessible storage medium of claim 1,
    wherein the plurality of producer agents includes a first producer agent executable to produce email items and a second producer agent executable to produce file system data items;
    wherein each of the archiving agents is executable to archive any of the email items and file system data items produced by the first producer agent and the second producer agent.

3. The non-transitory computer-accessible storage medium of claim 1,
    wherein the archiving agents are executable to archive the items produced by the producer agents to the one or more storage devices without using a central controller to assign each item to a particular archiving agent.

4. The non-transitory computer-accessible storage medium of claim 3,
    wherein the archiving agents are executable to communicate amongst themselves to determine which archiving agent should archive each item produced by the producer agents.

5. The non-transitory computer-accessible storage medium of claim 1,
    wherein each respective archiving agent is executable to publish information indicating an estimated archival completion time for the respective archiving agent;
    wherein a particular archiving agent is executable to archive a particular item to the one or more storage devices in response to determining that the particular archiving agent has the fastest estimated archival completion time among the archiving agents.

6. The non-transitory computer-accessible storage medium of claim 1,
    wherein the program instructions are executable to determine a desired number of archiving agents specified by an administrator and instantiate the desired number of archiving agents.

7. The non-transitory computer-accessible storage medium of claim 1,
    wherein the program instructions are further executable to implement an additional producer agent in addition to the plurality of producer agents, wherein the additional producer agent is executable to produce items of a particular type different from the types of items produced by the plurality of producer agents;
    wherein one or more of the archiving agents is not executable to archive items of the particular type produced by the additional producer agent.

8. The non-transitory computer-accessible storage medium of claim 1,
    wherein the program instructions are further executable to implement an additional archiving agent in addition to the plurality of archiving agents, wherein the additional archiving agent is executable to archive items of a first one or more types produced by the producer agents, but is not executable to archive items of a second one or more types produced by the producer agents.

9. The non-transitory computer-accessible storage medium of claim 8,
    wherein the plurality of archiving agents includes a particular archiving agent executable to:
        communicate with one or more other archiving agents to determine information indicating which types of items can be archived by the one or more other archiving agents; and
        select particular items to archive based at least in part on the information.

10. The non-transitory computer-accessible storage medium of claim 1,
    wherein the plurality of archiving agents includes a particular archiving agent executable to select an item of a first type for archiving in response to determining that there are more items of the first type waiting to be archived than items of a second type, and in response to determining that the plurality of archiving agents includes one or more archiving agents other than the particular archiving agent that can archive items of the second type.

11. The non-transitory computer-accessible storage medium of claim 1,
wherein the program instructions are further executable to implement one or more data classification agents executable to perform one or more of:
tagging items in order to cause the tagged items to be processed differently by the archiving agents;
tagging items in order to cause the tagged items to be processed differently by the indexing agents;
preventing particular items from being archived by the archiving agents.

12. The non-transitory computer-accessible storage medium of claim 1,
wherein the indexing agents are executable to index the items archived to the one or more storage devices without using a central controller to assign each item to a particular indexing agent.

13. The non-transitory computer-accessible storage medium of claim 1,
wherein each respective indexing agent is executable to publish information indicating an estimated indexing completion time for the respective indexing agent;
wherein a particular indexing agent is executable to add a particular item to the searchable index in response to determining that the particular indexing agent has the fastest estimated indexing completion time among the indexing agents.

14. A system comprising:
one or more storage devices;
one or more processors; and
memory storing program instructions;
wherein the program instructions are executable by the one or more processors to implement a plurality of producer agents, wherein each of the producer agents is configured to produce items of a different type and add the items to an item pool, wherein the item pool is configured to store a plurality of items having respective different types;
wherein the program instructions are further executable by the one or more processors to implement a plurality of archiving agents for archiving the items produced by the producer agents to one or more archives on the one or more storage devices, wherein each of the archiving agents is configured to archive any item of any type produced by the producer agents, wherein individual ones of the archiving agents are configured to select individual ones of the items in the item pool for archival, wherein the individual ones of the items in the item pool are selected for archival by particular ones of the archiving agents based at least in part on optimization of a quality of service metric provided by the archiving agents for archival of the items and based at least in part on an exchange of utilization data among individual ones of the archiving agents, wherein the quality of service metric is descriptive of a current estimated archival completion time, wherein the utilization data is descriptive of resource utilization by the archiving agents for archival of the items, and wherein individual ones of the archiving agents are executable to add archived items to an archived item pool;
wherein the program instructions are further executable by the one or more processors to implement a plurality of indexing agents configured to create one or more searchable indexes of the items archived to the one or more storage devices, wherein individual ones of the indexing agents are executable to select individual ones of the archived items from the archived item pool, and wherein the individual ones of the archived items are removed from the archived item pool in response to indexing of the individual ones of the archived items by the individual ones of the indexing agents.

15. The system of claim 14,
wherein the plurality of producer agents includes a first producer agent configured to produce email items and a second producer agent configured to produce file system data items;
wherein each of the archiving agents is configured to archive any of the email items and file system data items produced by the first producer agent and the second producer agent.

16. A method comprising:
executing on one or more computers a plurality of producer agents, wherein each of the producer agents executes to produce items of a different type and add the items to an item pool, wherein the item pool is configured to store a plurality of items having respective different types;
executing on the one or more computers a plurality of archiving agents, wherein each of the archiving agents is configured to archive any item of any type produced by the producer agents, wherein the archiving agents execute to select individual items from the item pool for archival and archive the items produced by the producer agents to one or more archives on one or more storage devices, wherein the individual ones of the items in the item pool are selected for archival by particular ones of the archiving agents based at least in part on optimization of a quality of service metric provided by the archiving agents for archival of the items and based at least in part on an exchange of utilization data among individual ones of the archiving agents, wherein the quality of service metric is descriptive of a current estimated archival completion time, wherein the utilization data is descriptive of resource utilization by the archiving agents for archival of the items, and wherein the archiving agents execute to add archived items to an archived item pool; and
executing on the one or more computers a plurality of indexing agents, wherein the indexing agents execute to create one or more searchable indexes of the items archived to the one or more storage devices, wherein the indexing agents execute to select individual ones of the archived items from the archived item pool, and wherein the individual ones of the archived items are removed from the archived item pool in response to indexing of the individual ones of the archived items by the indexing agents.

17. The method of claim 16,
wherein the plurality of producer agents includes a first producer agent that produces email items and a second producer agent that produces file system data items;
wherein each of the archiving agents is configured to archive any of the email items and file system data items produced by the first producer agent and the second producer agent.

* * * * *